United States Patent

[11] 3,544,038

[72] Inventor Kobert Smith II
24119 Summerhill Ave., Los Altos, California 94022
[21] Appl. No. 751,786
[22] Filed Aug. 12, 1968
[45] Patented Dec. 1, 1970

[54] TAPE TRANSPORT AND CARTRIDGE
9 Claims, 8 Drawing Figs.

[52] U.S. Cl. .......... 242/192
[51] Int. Cl. .......... G03b 1/04, G11b 15/32, G11b 23/04
[50] Field of Search .......... 242/55.12, 55.13, 55.14, 67.5; 274/11, 4

[56] References Cited
UNITED STATES PATENTS
3,125,311 3/1964 Willis .......... 242/55.14
3,154,308 10/1964 Faulkner .......... 274/11

*Primary Examiner*—Leonard D. Christian
*Attorney*—Flehr, Hohbach, Test, Albritton & Herbert

ABSTRACT: A tape transport device including a cartridge having takeup and supply rolls which are driven by an elastic belt. The belt supports the tape from the point of departure from the supply roll to the point of arrival of the tape on its takeup roll, thereby acting as a pressure pad for the tape. A driving capstan engages the belt drive, stretching it and producing a greater tension on the takeup reel than on the supply reel when the tape is driven to provide a constant tension on the tape in the zone between the departure and arrival points. No idler wheel is used, thus allowing for easy reversal of the tape without clutching or solenoids.

INVENTOR.
KOBERT REY SMITH II
BY
ATTORNEYS

INVENTOR.
KOBERT REY SMITH II
BY Fidelman, Wolbach, West; Albritton & Herbert:
ATTORNEYS

TAPE TRANSPORT AND CARTRIDGE

BACKGROUND OF THE INVENTION

This invention relates generally to a tape transport and more particularly to a tape transport in the form of a cartridge adapted to be inserted in an associated power unit.

There is a general need for very small tape recorders for use on the person. A major problem in miniaturizing such a tape is to develop a high efficiency tape drive mechanism. With a high efficiency mechanism a small motor may be used which in turn requires less power and smaller batteries.

Another problem in the manufacture of small, personalized tape recorders is the maintenance of constant speed drive. Most recorders of a miniaturized size in present use are of a rim drive type which inherently have a variable speed.

Another problem is the complex mechanical linkages and clutches required, for example, to reverse the direction of a driving capstan. This adds complexity and bulk to the design.

OBJECTS AND SUMMARY OF INVENTION

It is therefore a general object of this invention to provide an improved tape transport and cartridge.

It is another object of the present invention to provide a light, compact and relatively thin tape transport apparatus.

It is another object of the present invention to provide a tape unit which can be held and easily operated in one hand.

It is another object of the present invention to provide a tape transport which is simple in construction.

It is another object of the invention to provide a tape transport which has a highly efficient drive mechanism which requires less power and smaller batteries.

It is another object of the invention to provide a miniaturized tape recorder that is capstan driven with constant speed.

It is another object of the invention to provide a tape recorder that requires no clutches for tape takeup.

It is another object of the invention to provide a miniaturized tape recorder in which the direction of the tape is reversed by reversing the direction of the drive motor.

It is another object of the invention to provide a miniaturized tape recorder in which remote control is possible without the use of solenoids.

In accordance with the above objects, there is provided a tape transport of the type adapted to support a length of pliable recording tape wrapped to form supply and takeup reels and means for rotating and supporting each of the reels for rotation. Drive means are adapted to support and feed tape from the supply reel to the take up reel. The drive means are characterized by a continuous belt adapted to engage the periphery of the supply and takeup reels at the point of departure of the tape therefrom and at the point of arrival of the tape thereto, respectively. The belt has substantially continuous contact with the tape throughout the zone of tape movement extending from the point of departure to the point of arrival.

DETAILED DESCRIPTION OF PREFERRED EMBODIMENT

Figures 1, 2:
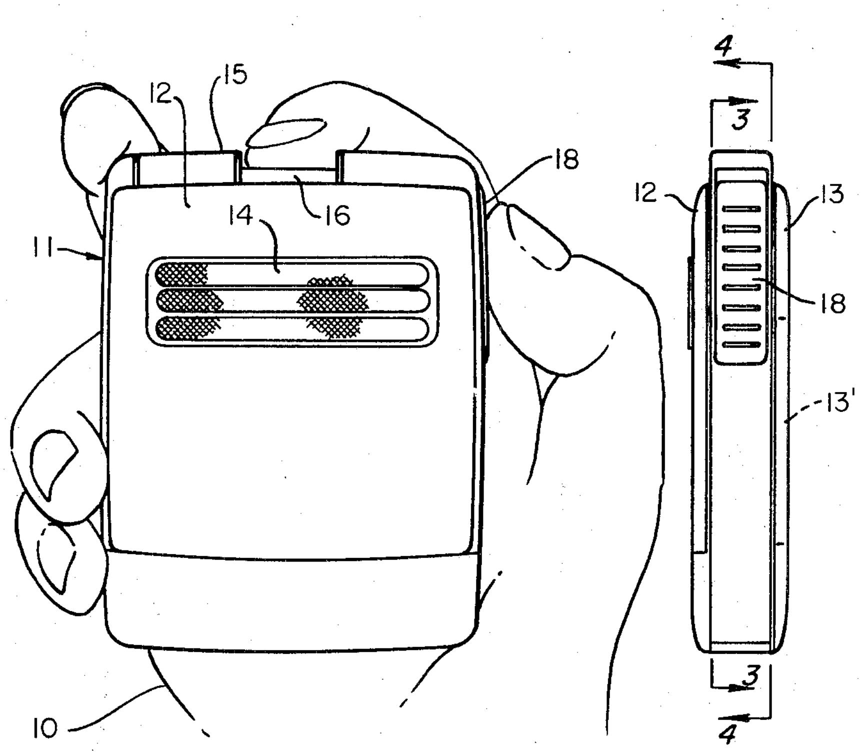
FIG. 1 is a plan view of a miniaturized tape recorder embodying the present invention.
FIG. 2 is a side view of FIG. 1.
Figure 5:
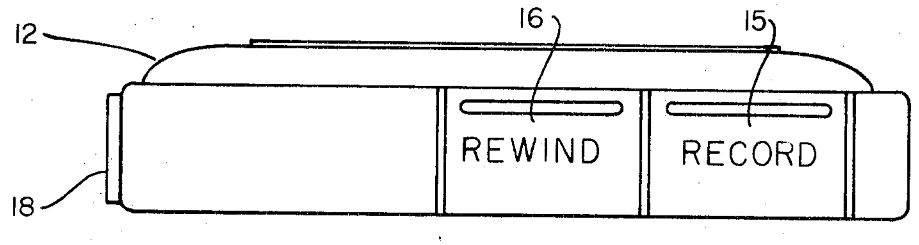
FIG. 5 is an end view of a device of FIG. 1.

Referring now particularly to FIGS. 1 and 2, the tape transport of the present invention includes a case or housing 11 which houses the operating mechanism, electrical and electronic circuits, microphone, speaker and batteries. The housing includes a front cover 12 and a back cover 13. Front cover 12 includes speaker slots 14. On the top portion of the housing there are two buttons 15 and 16 which are respectively for the purposes of record and rewind. All three of these features are best shown in FIG. 5. On the side of the cabinet 11 is a slide switch 18 to turn power on and off. The miniaturized size of housing 11 is illustrated by comparison to the hand 10 holding the unit.

Figure 3:
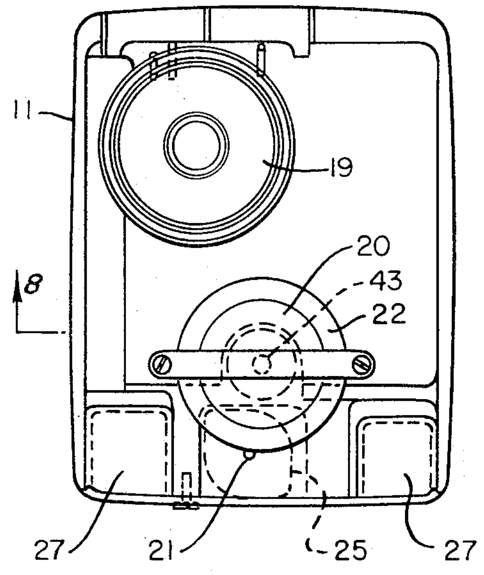
FIG. 3 is a cross-sectional view taken along the line 3–3 of FIG. 2.

In FIG. 3, cover 12 has been removed, exposing a loud speaker 19 which also serves as the microphone during recording, capstan fly wheel 20, and a spindle 21 which drives the capstan fly wheel and is coupled to a motor 25. The motor is positioned so that the spindle 21 engages the rubber portion or rim 22 on the edge of fly wheel 20. Means (not shown) are provided for urging the motor spindle 21 into engagement with the rubber rim 22. The motor is powered by hearing aid batteries 27 shown at the bottom of housing 11.

Figure 4:
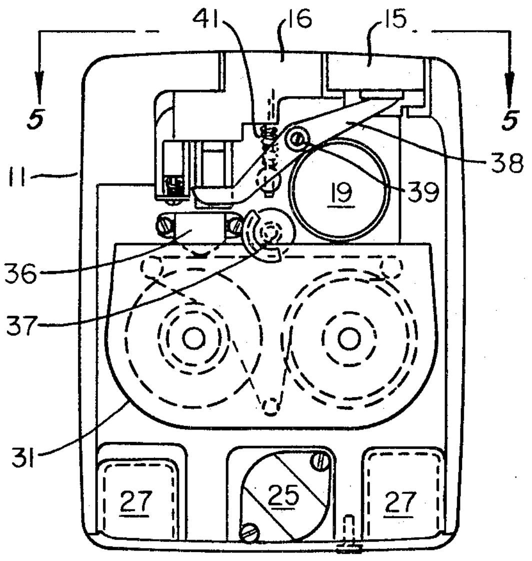
FIG. 4 is a cross-sectional view taken along the line 4–4 of FIG. 2.

FIG. 4 shows the other side of the housing 11 with back cover 13 removed and shows in detail the electronics of the device along with a tape cartridge 31 as it would be inserted into the associated housing. The back cover 13 includes an opening to permit insertion of a cartridge 31 into the machine. A transparent door 13' may be provided.

Cartridge 31 includes a supply reel 32 and a takeup reel 33 which carry tape 34 adapted to engage with recording and erase heads 36 and 37 when the cartridge is disposed within the unit. The magnetic heads and associated circuits are of a type well known in the art and are not further described herein.

Record button 15 and rewind button 16 are interlocked by means of a lever 38 which is pivoted at 39. Rewind button 16 is biased to its normal state by a spring 41. In operation, the power supply (not shown) is first activated, moving slide 18 to energize the unit. When the record button 15 is depressed, the electronics of the device are switched into the record mode. To remove the device from the record mode, the rewind button is depressed.

In the high speed rewind mode, additional voltage is applied to the motor 25 giving a 3 to 1 rewind ratio. In normal record mode, a lower voltage is applied to the motor 25 producing a lower speed.

Figure 8:
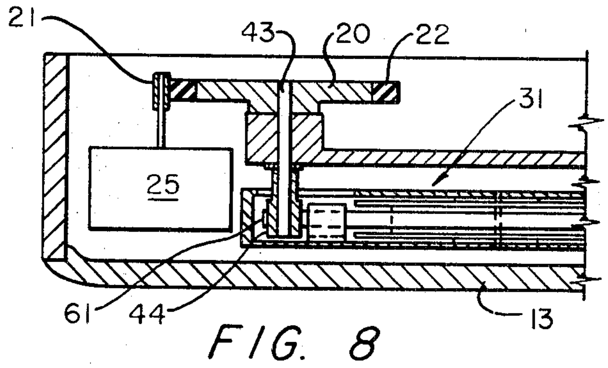
FIG. 8 is a cross-sectional view taken substantially along the line 8–8 of FIG. 3.

FIG. 8 shows in greater detail the motor spindle 21 and capstan fly wheel 20 with its rubber hub 22. The fly wheel is coupled through a shaft 43 to capstan 44 which drives a belt 66 in cartridge 31, the details of which will now be explained.

Figure 6:
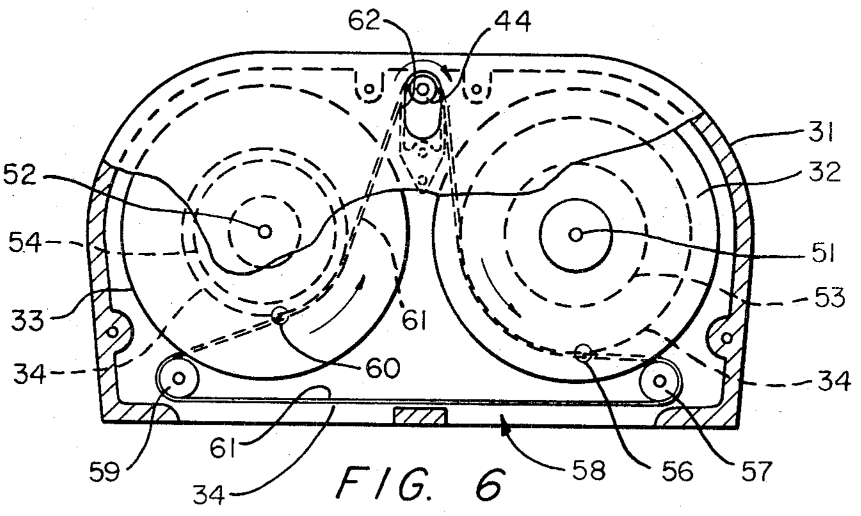
FIG. 6 is an elevational view partially broken away of a tape cartridge incorporating the features of the present invention.
Figure 7:
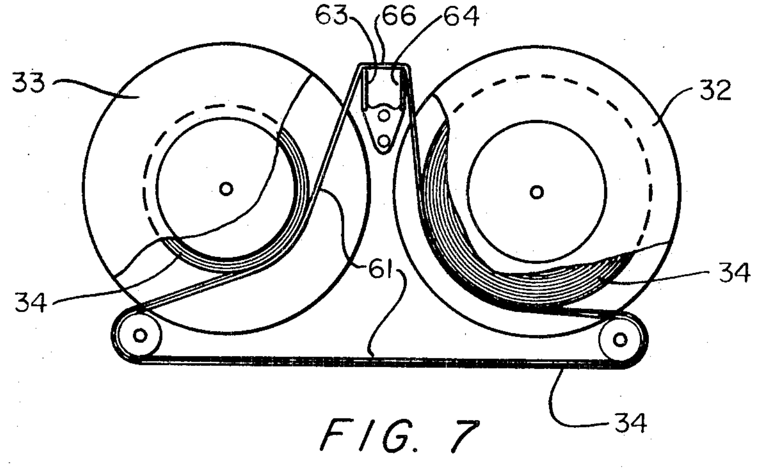
FIG. 7 is a simplified view of a portion of the cartridge of FIG. 6.

Referring now to the cartridge details in FIGS 6 and 7, the cartridge includes the supply reel 32 and takeup reel 33. Each reel hub is rotatably supported by shafts 51 and 52 suitably secured to the cartridge housing. The hubs 53 and 54 are shown in dashed lines. The hubs receive the tape to form tape rolls. The tape leaves the supply reel 32 at a point of departure 56 and extends around one roller 57 across zone 58 over a second roller 59 and into the point of arrival 60 on the takeup roll 33. Zone 58, as best shown in FIG. 4, accommodates the recording and erase heads 36, 37 (FIG. 4).

Drive means for driving the tape are characterized by a continuous belt 61 which may be elastic and may serve as a pressure pad for the tape between its point of departure 56 and the point of arrival 60. The belt is in contact with the inside of the tape with respect to the heads 36 and 37 and in operation extends around the capstan 44, as best shown in FIG. 8. The cartridge in FIG. 6 is shown as if it were inserted in housing 11 with the tape and belt wrapped around capstan 44. When the cartridge is inserted in the housing, the capstan 44 is inserted in a slot 62 and the cartridge is moved downward with respect to the drawing to engage belt 61. However, as shown in FIG 7, when the cartridge is not inserted in the housing, the belt is normally retained by supports 63 and 64 which, in effect, support a portion 66 of belt 61 which is to be later engaged by driving capstan 44 mounted in the associated housing. Thus, when the cartridge is inserted in its associated housing, the capstan will be in continuous engagement with belt 61 even when the tape is not being driven across the zone 58 past the heads 36 and 37.

In operation, belt 61 is tensioned by the action of capstan 44. This brings the belt into pressure contact with the supply and takeup rolls 32 and 33. When the capstan 44 begins to drive the belt, it rotates, as shown in FIG. 6, in a clockwise direction to thus tend to stretch the belt on the takeup side of the drive system in conjunction with takeup roll 33 as opposed to the supply side. This differential tension on the takeup roll aids the takeup process and generates a constant tension in the tape extending between the two rolls. Moreover, since capstan 44 is in frictional engagement only with belt 61, no clutch mechanism need be used to disengage the capstan. Normally, the tape could not be left in engagement with the capstan because it creates a "flat spot" on the tape. This would cause flutter and distortion in recording and reproduction. In the present invention capstan 44 engages a part of the drive system which is entirely disassociated from the actual recording tape. In other words, the capstan 44 engages a portion of the driving belt which is other than the zone between the point of departure 56 and the point of arrival 60.

The above clutchless feature of the present invention also allows for easy reversal of the tape without any solenoids or clutch mechanisms. All that need be done is the reversal of the drive motor 25. This facilitates the transcribe operation.

Thus, in conclusion, the present invention provides an improved miniaturized tape recorder with a very high efficiency drive mechanism because of the nature of the drive, a constant speed drive because it is capstan driven, and a device which is simple and reliable in operation because of the easy means of reversal of the tape.

I claim:

1. Tape transport apparatus including a housing for accommodating a drive capstan, capstan drive means, transducers and associated circuits for recording and reproducing signals on tape and means for receiving a tape cartridge to present the tape in said cartridge to said transducers, a cartridge including a case having an open end adapted to receive said transducers, a pair of tape reels mounted in said cartridge serving to support a roll of magnetic tape with a portion of the tape extending therebetween, spaced guide means serving to receive said tape portion and guide it across said open end to present the same to said transducers, tape drive means characterized by a continuous belt extending over said guide means and between said reels to engage the tape roll on facing sides of each of said rolls, said belt engaging the tape at the point of departure of the tape from one of said rolls and at the point of arrival at the other of said rolls and underlying the tape in its movement between said reels, said belt being adapted to engage the capstan when the cartridge is inserted in the apparatus whereby the capstan drive and belt frictionally drive the tape rolls to rotate said reels and move the tape from one roll past the open end of said cartridge, past said transducer and wind the tape upon the other roll.

2. A tape transport as in claim 1 in which said belt is elastic.

3. A tape transport as in claim 2 in which said elastic belt is pretensioned to produce in operation a greater tension in the belt section adjacent the takeup roll as compared to the tension in the belt section adjacent the supply roll.

4. A tape transport as in claim 3 in which said driving capstan is in contact with said belt for providing said pretension.

5. A tape transport as in claim 1 in which said tape reels are positioned in a common plane.

6. A tape transport as in claim 1 in which said belt acts as a pressure pad for the tape extending between the supply and takeup reels.

7. A tape transport as in claim 4 in which the sole force acting to maintain frictional engagement of said belt with said capstan is provided by the tension of said belt.

8. A tape cartridge for storing and presenting a tape medium to associated apparatus comprising a case having an open end, a pair of reels adapted to have the tape reeled thereon to form a roll rotatably disposed in said case, spaced guide means at said one end to guide the portion of the tape extending between said reels to present the tape at said open end whereby associated transducers can extend into said cartridge at said open end to operate on the tape, tape drive means characterized by a continuous belt extending over said guide means between said reels and in engagement with said tape roll and said tape at the point of departure of said tape from one of said reels to underlie said tape to present the tape to associated transducers to engage said tape and tape roll at its point of the arrival on the other of said reels, and means adjacent the other end of said cartridge for maintaining said belt in engagement with said tape roll and tape when the cartridge is disassociated from associated apparatus.

9. A tape cartridge as in claim 8 in which said engagement maintaining means delineates a portion of said belt for engagement by a driving capstan mounted on said associated apparatus.